(12) United States Patent
Jones et al.

(10) Patent No.: US 10,253,240 B2
(45) Date of Patent: Apr. 9, 2019

(54) COMPATIBILIZED CEMENT COMPOSITION FOR TREATMENT OF A SUBTERRANEAN FORMATION

(71) Applicant: Halliburton Energy Services, Inc., Houston, TX (US)

(72) Inventors: Paul Joseph Jones, Houston, TX (US); Ramesh Muthusamy, Pune (IN); Abhimanyu Pramod Deshpande, Pune (IN); Greg Robert Hundt, Spring, TX (US); Jeffery Dwane Karcher, Houston, TX (US); Brittney Nicole Guillory, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/539,076

(22) PCT Filed: Jan. 22, 2015

(86) PCT No.: PCT/US2015/012501
§ 371 (c)(1),
(2) Date: Jun. 22, 2017

(87) PCT Pub. No.: WO2016/118146
PCT Pub. Date: Jul. 28, 2016

(65) Prior Publication Data
US 2017/0369761 A1    Dec. 28, 2017

(51) Int. Cl.
*E21B 33/13*    (2006.01)
*C09K 8/467*    (2006.01)
(Continued)

(52) U.S. Cl.
CPC .............. *C09K 8/467* (2013.01); *C04B 14/06* (2013.01); *C04B 24/121* (2013.01);
(Continued)

(58) Field of Classification Search
CPC ..... C09K 8/467; C04B 24/42; C04B 2103/44; E21B 33/13
See application file for complete search history.

(56) References Cited

U.S. PATENT DOCUMENTS

| 5,730,922 A | * | 3/1998 | Babb ................... C08F 14/185 264/257 |
| 7,044,224 B2 | | 5/2006 | Nguyen |

(Continued)

FOREIGN PATENT DOCUMENTS

| CA | 2233468 A1 | 9/1998 |
| WO | 2013184469 A1 | 12/2013 |

OTHER PUBLICATIONS

International Search Report and Written Opinion issued in corresponding application No. PCT/US2015/012501 dated Oct. 16, 2015, 11 pgs.

*Primary Examiner* — Zakiya W Bates
(74) *Attorney, Agent, or Firm* — Chamberlain Hrdlicka

(57) ABSTRACT

A compatibilized cement composition for the treatment of a subterranean formation and a method of treating a subterranean formation are disclosed. The method can include placing in a subterranean formation a composition including a compatibilized cement composition. The compatibilized cement composition can include a curable resin or cured product thereof, a cement slurry, and a compatibilizer composition, a reaction product thereof, or a combination thereof. The compatibilizer composition can include a substituted or unsubstituted $C_5$-$C_{50}$ hydrocarbon including at least one internal olefin and a polyether.

19 Claims, 3 Drawing Sheets

(51) Int. Cl.

| | | |
|---|---|---|
| *C04B 26/14* | (2006.01) | |
| *C04B 28/04* | (2006.01) | |
| *C04B 14/06* | (2006.01) | |
| *C04B 24/12* | (2006.01) | |
| *C04B 24/28* | (2006.01) | |
| *C04B 24/42* | (2006.01) | |
| *C08L 1/04* | (2006.01) | |
| C04B 103/44 | (2006.01) | |

(52) U.S. Cl.
CPC ............ *C04B 24/281* (2013.01); *C04B 24/42* (2013.01); *C04B 26/14* (2013.01); *C04B 28/04* (2013.01); *C08L 1/04* (2013.01); *C04B 2103/44* (2013.01)

(56) References Cited

U.S. PATENT DOCUMENTS

| | | |
|---|---|---|
| 8,739,877 B2 | 6/2014 | Robb et al. |
| 2008/0302570 A1 | 12/2008 | Deboer |
| 2010/0300694 A1* | 12/2010 | Vonderhagen ........... A61K 8/02 166/311 |
| 2012/0328377 A1 | 12/2012 | Brenneis et al. |
| 2014/0374097 A1 | 12/2014 | Morgan et al. |

\* cited by examiner

COMPATIBILIZED CEMENT COMPOSITION FOR TREATMENT OF A SUBTERRANEAN FORMATION

BACKGROUND

Cements play an important role in wellbore integrity. Cements may be used in primary cementing operations whereby pipe strings, such as casing and liners, are cemented in well bores. In a typical primary cementing operation, a cement may be pumped into an annulus between the exterior surface of the pipe string disposed therein and the walls of the well bore (or a larger conduit in the well bore). The cement may set in the annulus, thereby forming an annular sheath of hardened, substantially impermeable material (e.g., a cement sheath) that may support and position the pipe string in the well bore and may bond the exterior surface of the pipe string to the well bore walls (or to the larger conduit). Cements may also be used in remedial cementing methods, such as in squeeze cementing for sealing voids in a pipe string, cement sheath, gravel pack, subterranean formation, and the like.

Once set, the cement sheath may be subjected to a variety of shear, tensile, impact, flexural, and compressive stresses that may lead to failure of the cement sheath, resulting, inter alia, in fractures, cracks, and/or debonding of the cement sheath from the pipe string and/or the formation. This may lead to undesirable consequences such as lost production, environmental pollution, hazardous rig operations resulting from unexpected fluid flow from the formation caused by the loss of zonal isolation, and/or hazardous production operations. Cement failures may be particularly problematic in high temperature wells, where fluids injected into the wells or produced from the wells by way of the well bore may cause the temperature of any fluids trapped within the annulus to increase. Furthermore, high fluid pressures and/or temperatures inside the pipe string may cause additional problems during testing, perforation, fluid injection, and/or fluid production. If the pressure and/or temperature inside the pipe string increases, the pipe may expand and stress the surrounding cement sheath. This may cause the cement sheath to crack, or the bond between the outside surface of the pipe string and the cement sheath to fail, thereby breaking the hydraulic seal between the two. Furthermore, high temperature differentials created during production or injection of high temperature fluids through the well bore may cause fluids trapped in the cement sheath to thermally expand, causing high pressures within the sheath itself. Additionally, failure of the cement sheath also may be caused by forces exerted by shifts in subterranean formations surrounding the well bore, cement erosion, and repeated impacts from the drill bit and the drill pipe.

The addition of epoxy resins to cement can increase the mechanical properties of the resulting cement composition. Specifically, reductions in Young's modulus and Poisson's ratio accompanied by an increase in compressive strength can be observed. Further, the permeability of cement compositions can be reduced by the addition of epoxy resins.

However, the addition of epoxy resins to cement mixtures can adversely affect the rheology of the cement mixture, such as when the epoxy resin is the minor component.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION OF THE INVENTION

Figure 1:
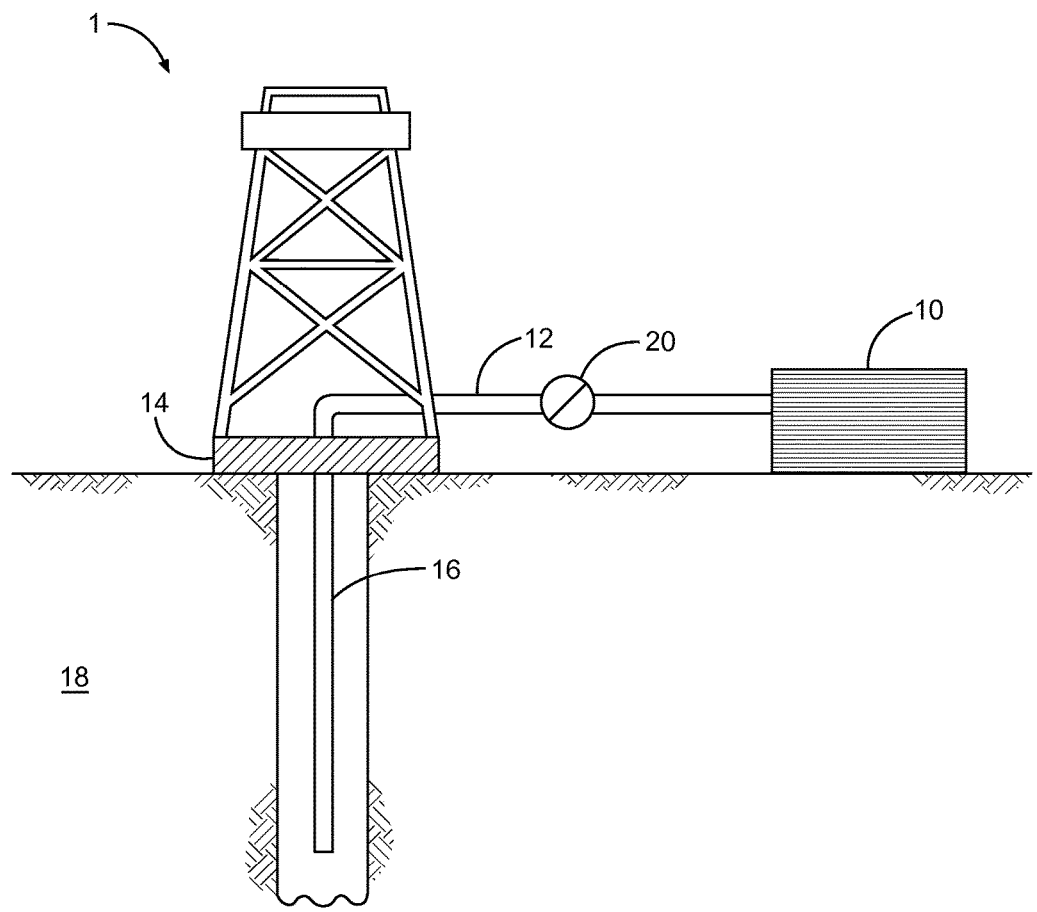
FIG. 1 illustrates a system or apparatus for delivering a composition to a subterranean formation, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000,1" is equivalent to "0.0001."

In the methods of manufacturing described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O(oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4- 2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl groups are alkenyl groups as defined herein in which a hydrogen or carbon bond of an alkyl group is replaced with a bond to an aryl group as defined herein.

The term "heterocyclyl" as used herein refers to aromatic and non-aromatic ring compounds containing three or more ring members, of which one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a $C_2$-heterocyclyl can be a 5-ring with two carbon atoms and three heteroatoms, a 6-ring with two carbon atoms and four heteroatoms and so forth. Likewise a $C_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The term "heterocyclylalkyl" as used herein refers to alkyl groups as defined herein in which a hydrogen or carbon bond of an alkyl group as defined herein is replaced with a bond to a heterocyclyl group as defined herein. Representative heterocyclyl alkyl groups include, but are not limited to, furan-2-yl methyl, furan-3-yl methyl, pyridine-3-yl methyl, tetrahydrofuran-2-yl ethyl, and indol-2-yl propyl.

The term "heteroarylalkyl" as used herein refers to alkyl groups as defined herein in which a hydrogen or carbon bond of an alkyl group is replaced with a bond to a heteroaryl group as defined herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Non-limiting examples of solvents are silicones, organic compounds, water, alcohols, ionic liquids, and supercritical fluids.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having n$_i$ molecules of molecular weight M$_i$ through the formula $M_n = \Sigma M_i n_i / \Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt. % to about 99.999 wt. % of a composition, or a mixture including the same, or about 0.001 wt. % or less, 0.01 wt. %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt. % or more.

In various embodiments, the present invention provides a method of treating a subterranean formation. The method includes placing in a subterranean formation a composition including a compatibilized cement composition. The compatibilized cement composition includes a curable resin or cured product thereof, a cement slurry, and a compatibilizer composition, a reaction product thereof, or a combination thereof. The compatibilizer composition includes a substituted or unsubstituted $C_5$-$C_{50}$ hydrocarbon including at least one internal olefin and a polyether.

In various embodiments, the present invention provides a method of treating a subterranean formation. The method includes placing in a subterranean formation a composition including a compatibilized cement composition. The compatibilized cement composition includes a curable resin or cured product thereof, a cement slurry, and a compatibilizer composition, a reaction product thereof, or a combination thereof. The curable resin or cured product thereof includes diglycidyl ether bisphenol A resin, butyl glycidyl ether, cyclohexane methanol diglycidyl ether, diethyl toluene diamine, and 2,4,6-tris(dimethylaminomethyl)phenol and is about 1% to about 50% by volume of the compatibilized cement composition. The cement slurry includes a class G cement, water, and hydroxyl ethyl cellulose and the cement slurry is about 50% to about 99% by volume of the compatibilized cement composition. The compatibilizer composition includes a $C_{15}$-$C_{18}$ alkene with at least one internal olefin. The compatibilizer composition further includes a polyether having the structure

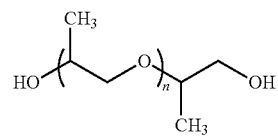

The variable n is about 40 to about 100. The compatibilizer composition is about 0.01% to about 5.0% by weight of water.

In various embodiments, the present invention provides a system including a composition that includes a compatibilized cement composition. The compatibilized cement composition includes a curable resin or cured product thereof, a cement slurry, and a compatibilizer composition, a reaction product thereof, or a combination thereof. The compatibilizer composition includes a substituted or unsubstituted $C_5$-$C_{50}$ hydrocarbon including at least one internal olefin and a polyether. The system further comprises a subterranean formation including the composition therein.

In various embodiments, the present invention provides a composition for the treatment of a subterranean formation. The composition includes a compatibilized cement composition. The compatibilized cement composition includes a curable resin or cured product thereof, a cement slurry, and a compatibilizer composition, a reaction product thereof, or a combination thereof. The compatibilizer composition includes a substituted or unsubstituted $C_5$-$C_{50}$ hydrocarbon including at least one internal olefin and a polyether.

In various embodiments, the present invention provides a composition for the treatment of a subterranean formation. The composition includes a compatibilized cement composition. The compatibilized cement composition includes a curable resin or cured product thereof, a cement slurry, and a compatibilizer composition, a reaction product thereof, or a combination thereof. The curable resin or cured product thereof includes diglycidyl ether bisphenol A resin, butyl glycidyl ether, cyclohexane methanol diglycidyl ether, diethyl toluene diamine, and 2,4,6-tris(dimethylaminomethyl)phenol and is about 1% to about 50% by volume of the compatibilized cement composition. The cement slurry includes a class G cement, water, and hydroxyl ethyl cellulose and the cement slurry is about 50% to about 99% by volume of the compatibilized cement composition. The compatibilizer composition includes a $C_{15}$-$C_{18}$ alkene with at least one internal olefin. The compatibilizer composition further includes a polyether having the structure

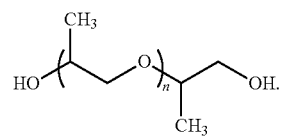

The variable n is about 40 to about 100. The compatibilizer composition is about 0.01% to about 5.0% by weight of water.

In various embodiments, the present invention provides a method of preparing a composition for the treatment of a subterranean formation. The method includes forming a composition including a compatibilized cement composition. The forming of the compatibilized cement composition includes mixing a cement slurry and a compatibilizer composition, a reaction product thereof, or a combination thereof. The compatibilizer composition includes a substituted or unsubstituted $C_5$-$C_{50}$ hydrocarbon including at least one internal olefin and a polyether. The forming of the compatibilized cement composition further includes mixing a curable resin or cured product thereof with the mixed cement slurry and compatibilizer composition.

In various embodiments, the compatibilizer composition can advantageously affect the rheology of a compatibilized cement composition employed for the treatment of a subterranean formation. In various embodiments, the advantageous effects on rheology can be observed before the cement sets and especially during the mixing of a compatibilized cement composition. In various embodiments, the compatibilizer composition can decrease the shear stress of a compatibilized cement composition as compared to a cement composition not including a compatibilizer composition.

In various embodiments, the compatibilized cement compositions can improve mud displacement and improve cement placement. In various embodiments, the compatibilized cement compositions can lower friction during pumping. Lower friction during pumping can be especially beneficial in long horizontal wells, deep offshore wells, and ultra-deep wells.

In various embodiments, the compatibilized cement composition can have a lower equivalent circulating density (ECD) during the placement of the compatibilized cement composition in the annulus of a well bore for primary zonal isolation, such as compared to that of a cement composition without a compatibilizer composition.

In various embodiments, the compatibilizer composition can increase the ease of mixing between a curable resin or cured product thereof and a cement slurry. The increase in the ease of mixing a curable resin or cured product thereof and a cement slurry can decrease the time necessary to prepare a cement for the treatment of a subterranean formation. In various embodiments, the compatibilizer composition can increase the homogeneity of a curable resin with a cement slurry. In various embodiments, the compatibilizer can increase the dispersion of a curable resin or cured product thereof within a cement matrix.

In various embodiments, the compatibilizer can stabilize the dispersion of resin in the cement matrix and prevent phase separation prior to curing of the cement and resin.

Method of Treating a Subterranean Formation

In various embodiments the present invention provides a method of treating a subterranean formation. The method includes placing in a subterranean formation a composition including a compatibilized cement composition. In various embodiments, the compatibilized cement composition includes a curable resin or a cured product thereof, a cement slurry, and a compatibilizer composition, a reaction product thereof, or a combination thereof. In various embodiments, the compatibilizer composition includes a substituted or unsubstituted $C_5$-$C_{50}$ hydrocarbon including at least one internal olefin and a polyether. The compatibilized cement composition can have a lower shear stress when compared to a similar cement composition without a compatibilizer composition.

In various embodiments, the curable resin or cured product thereof is less than about 50% by volume of the compatibilized cement composition. The curable resin or cured product thereof can be less than about 50%, 45%, 40%, 35%, 30%, 25%, 20%, 15%, 10%, or less than about 5% by volume of the compatibilized cement composition. The curable resin or cured product thereof can be about 1-50%, 1-25%, 25-50%, 1-10%, 10-20%, 20-30%, 30-40%, or about 40-50% by volume of the compatibilized cement composition, or about 1%, 5%, 10%, 15%, 20%, 25%, 30%, 35%, 40%, 45% or about 50% or greater by volume of the compatibilized cement composition.

In various embodiments, the cement slurry is greater than about 50% by volume of the compatibilized cement composition. In some embodiments, the cement slurry is greater than about 99%, 98%, 87%, 96%, 95%, 90%, 85%, 80%, 75%, 70%, 65%, 60%, 55% or greater than about 50% by volume of the compatibilized cement composition. In some embodiments, the cement slurry is about 50-99%, 55-99%, 60-99%%, 65-99%, 70-99%, 75-99%, 80-99%, 85-99%, 90-99%, 95-99%, 55-95%, 60-90%, 65-85%, or about 70-80%, or about 50%, 55%, 60%, 65%, 70%, 75%, 80%, 85%, 90%, 95% or about 99% by volume of the compatibilized cement composition.

In various embodiments, the compatibilizer composition is about 0.01 to about 5.0% by weight of water. The term, "by weight of water," or "BWOW," as used herein, refers to the amount (e.g., in percent) of a material within a composition based on the weight of water used to prepare a cement slurry within the corresponding composition. In some embodiments, the compatibilizer composition is about 0.01-4.0%, 0.01-3.0%, 0.01-2.0%, 0.01-1.0%, 0.01-0.90%, 0.01-0.80%, 0.01-0.70%, 0.01-0.60%, 0.01-0.50%, 0.01-0.40%, 0.01-0.30%, 0.01-0.20%, or about 0.05-0.15%, or about 0.01%, 0.05%, 0.10%, 0.15%, 0.20%, 0.25%, 0.30%, 0.40%, 0.50%, 0.60%, 0.70%, 0.80%, 0.90%, 1.0%, 1.2%. 1.4%, 1.6%, 1.8%, 2.0%, 2.5%, 3.0%, 3.5%, 4.0%, 4.5%, or about 5.0% by weight of water.

In various embodiments, the shear stress of the composition can be less than that of a corresponding composition without the compatibilizer composition. For example, for a compatibilized cement composition including about 5% by volume of a curable resin or cured product thereof and about 95% by volume of a cement slurry including about 0.1% by weight of water of a compatibilizer composition as compared to a corresponding composition that is free of a compatibilizer composition, the compatibilized cement composition provides a reduction in shear stress of about 1 Pascal (Pa) to about 40 Pa, about 1 Pa to about 30 Pa, about 1 Pa to about 20 Pa, about 1 Pa to about 15 Pa, about 1 Pa to about 10 Pa, or about 5 Pa to about 15 Pa, or about 1 Pa, 2 Pa, 4 Pa, 6 Pa, 8 Pa, 10 Pa, 12 Pa, 15 Pa, 20 Pa, 30 Pa, or a reduction in shear stress of about 40 Pa at a shear rate of about 1 s$^{-1}$ to about 140 s$^{-1}$, 1 s$^{-1}$ to about 25 s$^{-1}$, 25 s$^{-1}$ to about 50 s$^{-1}$, 50 s$^1$ to about 75 s$^{-1}$, 75 s$^{-1}$ to about 100 s$^{-1}$, or about 100 s$^{-1}$ to about 140 s$^{-1}$, or about 1 s$^{-1}$, 25 s$^{-1}$, 50 s$^{-1}$, 69 s$^{-1}$, 75 s$^{-1}$, 100 s$^{-1}$, 125 s$^{-1}$, or at a shear rate of about 140 s$^{-1}$ at standard temperature and pressure.

In various embodiments, the shear stress of the composition can be less than that of a corresponding composition without the compatibilizer composition. For example, for a compatibilized cement composition including about 25% by volume of a curable resin or cured product thereof and about 75% by volume of a cement slurry including about 0.1% by weight of water of a compatibilizer composition as compared to a corresponding composition that is free of a compatibilizer composition, the compatibilized cement composition provides a reduction in shear stress of about 1 Pascal (Pa) to about 40 Pa, about 1 Pa to about 30 Pa, about 1 Pa to about 20 Pa, about 1 Pa to about 15 Pa, about 1 Pa to about 10 Pa, or about 5 Pa to about 15 Pa, or about 1 Pa, 2 Pa, 4 Pa, 6 Pa, 8 Pa, 10 Pa, 12 Pa, 15 Pa, 20 Pa, 30 Pa, or a reduction in shear stress of about 40 Pa at a shear rate of about 1 s$^{-1}$ to about 140 s$^{-1}$, 1 s$^{-1}$ to about 25 s$^{-1}$, 25 s$^{-1}$ to about 50 s$^{-1}$, 50 s$^1$ to about 75 s$^{-1}$, 75 s$^{-1}$ to about 100 s$^{-1}$, or about 100 s$^{-1}$ to about 140 s$^{-1}$, or about 1 s$^{-1}$, 25 s$^{-1}$, 50 s$^{-1}$, 69 s$^{-1}$, 75 s$^{-1}$, 100 s$^{-1}$, 125 s$^{-1}$, or at a shear rate of about 140 s$^{-1}$ at standard temperature and pressure.

In various embodiments, the method can further include obtaining or providing the composition, wherein the obtaining or providing of the composition occurs above-surface. In various embodiments, the method can further include obtaining or providing the composition, wherein the obtaining or providing of the composition occurs in the subterranean formation.

In various embodiments, the method can further include combining the composition with an aqueous or oil-based fluid including a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof, to form a mixture, wherein the placing the composition in the subterranean formation includes placing the mixture in the subterranean formation.

In various embodiments, the placing of the composition in the subterranean formation can include pumping the composition through a tubular disposed in a wellbore and into the subterranean formation.

Curable Resin or Cured Product Thereof.

In various embodiments, the curable resin or cured product thereof includes an epoxy resin. The term "epoxy resin," as used herein, refers to any compound having one or more epoxy function groups.

In various embodiments, the epoxy resin is about 50 wt. % to about 99 wt. % of the curable resin or cured product thereof. In some embodiments, the epoxy resin is about, 55-95 wt. %, 60-90 wt. %, 65-85 wt. %, 70-80 wt. %, or about 72-78 wt. % of the curable resin or cured product thereof. In some embodiments, the epoxy resin is about 50 wt. %, 55 wt. %, 60 wt. %, 65 wt. %, 70 wt. %, 75 wt. %, 80 wt. %, 85 wt. %, 90 wt. %, 95 wt. % or about 99 wt. % of the curable resin or cured product thereof.

In various embodiments, the epoxy resin is chosen from cycloaliphatic epoxides, bis(3,4-epoxycyclohexylmethyl) adipate, bis(3,4-epoxy-6-methylcyclohexyl-methyl)adipate, bis(3,4-epoxycyclohexylmethyl)pimelate, cyclohexane methanol diglycidyl ether, 3,4-epoxycyclohexylmethyl-3,4-epoxycyclohexane carboxylate, 3,4-epoxy-1-methylcyclohexylmethyl-3,4-epoxycyclohexane carboxylate, 3,4-epoxy-1-methylcyclohexylmethyl-3,4-epoxy-1-methylcyclohexane carboxylate, 6-methyl-3,4-epoxycyclohexylmethyl-6-methyl-3,4-epoxycyclohexane carboxylate, 3,4-epoxy-3-methylcyclohexylmethyl-3,4-epoxy-3-methylcyclohexane carboxylate, 3,4-epoxy-5-methylcyclohexylmethyl-3,4-epoxy-5-methylcyclohexane carboxylate, 2-(3,4-epoxycyclohexyl-5,5-spiro-3,4-epoxy) cyclohexane-meta-dioxane, glycidyl epoxides, aliphatic epoxides, epoxy cresol novolac resins, epoxy phenol novolac resins, polynuclear phenol glycidyl ether-derived resins, aromatic glycidyl amine resins, heterocyclic glycidyl amine resins, hydantoin epoxy resins, natural oils epoxides, soybean oil epoxides, linseed oil epoxides, diglycidyl ether bisphenol A resin, bisphenol A diglycidyl ether, butyl glycidyl ether, and combinations thereof. The epoxy resin can be chosen from diglycidyl ether bisphenol A resin, butyl glycidyl ether, cyclohexane methanol diglycidyl ether, and combinations thereof.

In some embodiments, the diglycidyl ether bisphenol A resin is about 1-99 wt. %, 40-95 wt. %, 50-90 wt. %, 55-85 wt. %, 60-80 wt. %, or about 65-75 wt. % of the epoxy resin or about 5 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, 95 wt. %, or about 100 wt. % of the epoxy resin.

In some embodiments, the butyl glycidyl ether is about 1-99%, 1-90 wt. %, 1-80 wt. %, 1-70 wt. %, 1-60 wt. %, 1-50 wt. %, 1-40 wt. %, 2-30 wt. %, 3-20 wt. %, 4-15 wt. %, or about 5-10 wt. % or about 5 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, 95 wt. %, or about 100 wt. % of the epoxy resin.

In some embodiments, the cyclohexane methanol diglycidyl ether is about 1-99%, 1-90 wt. %, 1-80 wt. %, 1-70 wt. %, 1-60 wt. %, 5-50 wt. %, 10-40 wt. %, 15-35 wt. %, 20-30 wt. %, or about 5 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, 95 wt. %, or about 100 wt. % of the epoxy resin.

In various embodiments, the curable resin or cured product thereof includes an amine hardener. In various embodiments, the amine hardener is about 1 wt. % to about 50 wt. % of the curable resin or cured product thereof. In some embodiments, the amine harder is about 5-45 wt. %, 10-40 wt. %, 15-35 wt. %, 20-30 wt. %, 22-28 wt. % or about 1 wt. % or less, 5 wt. %, 10 wt. %, 15 wt. %, 20 wt. %, 25 wt. %, 30 wt. %, 35 wt. %, 40 wt. %, 45 wt. % or about 50 wt. % or more of the curable resin or cured product thereof.

In various embodiments, the amine hardener is chosen from aliphatic amines, aliphatic tertiary amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, N-aminophenyl piperazine, imidazoline, 1,2-diaminocyclohexane, polytheramine, diethyl toluene diamine, 2,4,6-tris(dimethylaminomethyl)phenol, 4,4'-diaminodiphenyl methane, methyltetrahydrophthalic anhydride, hexahydrophthalic anhydride, maleic anhydride, polyazelaic polyanhydride, phthalic anhydride, piperazine, aminoethylpiperazine, 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, β-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexamethylene imine, indazole, amines, bis-amines, tris-amines, aromatic amines, polyamines, aliphatic amines, cyclo-aliphatic amines, amides, polyamides, 2-ethyl-4-methyl imidazole, 1,1,3-trichlorotrifluoroacetone, bis(methylthio)-toluene diamine (e.g., dimethyl thio-toluene diamine, CAS No. 106264-79-3), or combinations thereof. The amine hardener can be chosen from diethyl toluene diamine, 2,4,6-tris(dimethylaminomethyl)phenol, bis(methylthio)-toluene diamine and combinations thereof.

In some embodiments, the diethyl toluene diamine is about 1-99%, 10-99 wt. %, 20-99 wt. %, 30-99 wt. %, 40-99 wt. %, 50-99 wt. %, 60-99 wt. %, 70-99 wt. %, 80-99 wt. %, or about 85-95% or about 5 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, 95 wt. %, or about 100 wt. % of the amine hardener.

In various embodiments, the 2,4,6-tris(dimethylaminomethyl)phenol is about 1-99%, 1-90 wt. %, 1-80 wt. %, 1-70 wt. %, 1-60 wt. %, 1-50 wt. %, 1-40 wt. %, 1-30 wt. %, 1-20, wt. %, or about 5-15% or about 5 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, 95 wt. %, or about 100 wt. % of the amine hardener.

In some embodiments, the bis(methylthio)-toluene diamine is about 1-99%, 10-99 wt. %, 20-99 wt. %, 30-99 wt. %, 40-99 wt. %, 50-99 wt. %, 60-99 wt. %, 70-99 wt. %, 80-99 wt. %, or about 85-95% or about 5 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, 95 wt. %, or about 100 wt. % of the amine hardener.

Cement Slurry.

In various embodiments, the cement slurry comprises a cement and water. In various embodiments, the cement comprises Portland cement, pozzolana cement, gypsum cement, high alumina content cement, slag cement, silica cement, pumice, perlite, and combinations thereof. In some embodiments, the cement comprises Portland cement. Portland cements that are suitable for use in embodiments of the present invention are classified as Classes A, C, H, and G cements according to the American Petroleum Institute, *API Specification for Materials and Testing for Well Cements*, API Specification 10, Fifth Ed., Jul. 1, 1990.

In various embodiments, the cement slurry comprises water. The water can be any suitable water. The water can include at least one of fresh water, brine, produced water, flowback water, brackish water, and sea water. In some embodiments, the water is about 30% to about 60% by weight of cement. In some embodiments, the water is about 35-55%, 40-50%, or about 42-48%, or about 10%, 15%, 20%, 25%, 30%, 35%, 40%, 45%, 50%, 55%, 60%, 65%, 70%, 75%, 80%, or about 85% or more by weight of cement. The term "by weight of cement" or "BWOC," as used herein, refers to the amount of a material added to a cement slurry based on the weight of cement used to prepare the cement slurry (e.g., a cement slurry including 100 g of Portland cement and 25 g of water would include Portland cement in amount of 100% by weight of cement and water in an amount of 25% by weight of cement).

In various embodiments, the cement slurry further comprises a thickener. In some embodiments, the thickener is about 0.01% to about 2.0% by weight of cement. In some embodiments, the thickener is about 0.01-1.75%, 0.01-1.50%, 0.01-1.25%, 0.01-1.00%, 0.05% 0.75%, 0.10%-0.50, 0.15%, or about 0.15-35%, or about 0.01%, 0.05%, 0.10%, 0.15%, 0.20%, 0.30%, 0.40%, 0.50%, 0.60%, 0.80%, 1.0%, 1.2%, 1.4%, 1.6%, 1.8%, or about 2.0% by weight of cement. In some embodiments, the thickener is chosen from poly(acrylic acid) or ($C_1$-$C_5$)alkyl esters thereof, poly (methacrylic acid) or ($C_1$-$C_5$)alkyl esters thereof, poly(vinyl acetate), poly(vinyl alcohol), poly(ethylene glycol), poly (vinyl pyrrolidone), polyacrylamide, poly (hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum, gum ghatti, gum arabic, locust bean gum, cellulose, and derivatized cellulose. In some embodiments, the thickener is hydroxyl ethyl cellulose.

Compatibilizer Composition.

In various embodiments, the compatibilizer composition can include a substituted or unsubstituted $C_5$-$C_{50}$ hydrocarbon including at least one internal olefin and a polyether.

In various embodiments, the substituted or unsubstituted $C_5$-$C_{50}$ hydrocarbon including at least one internal olefin, can be about 20 wt. % to about 90 wt. % of the compatibilizer composition. In some embodiments, the substituted or unsubstituted $C_5$-$C_{50}$ hydrocarbon including at least one internal olefin can be about 30-80 wt. %, 40-75 wt. %, 50-70 wt. %, or about 55-65 wt. %, or about 1 wt. %, 5 wt. %, 10 wt. %, 15 wt. %, 20, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, 95 wt. % or about 97 wt. % or greater of the compatibilizer composition.

In some embodiments, the substituted or unsubstituted $C_5$-$C_{50}$ hydrocarbon including at least one internal olefin can be a $C_{10}$-$C_{30}$ alkene with at least one internal olefin. In some embodiments, the substituted or unsubstituted $C_5$-$C_{50}$ hydrocarbon including at least one internal olefin can be a $C_{10}$-$C_{40}$ alkene with at least one internal olefin. In some embodiments, the substituted or unsubstituted $C_5$-$C_{50}$ hydrocarbon including at least one internal olefin can be a $C_{12}$-$C_{30}$ alkene with at least one internal olefin. In some embodiments, the substituted or unsubstituted $C_5$-$C_{50}$ hydrocarbon including at least one internal olefin can be a $C_{14}$-$C_{20}$ alkene with at least one internal olefin. In some embodiments, the substituted or unsubstituted $C_5$-$C_{50}$ hydrocarbon including at least one internal olefin can be a $C_{15}$-$C_{18}$ alkene with at least one internal olefin.

In various embodiments, the polyether can be about 10 wt. % to about 50 wt. % of the compatibilizer composition. In some embodiments, the polyether can be about 15-45 wt. %, 20-40 wt. %, or about 25-35 wt. %, or about 10 wt. %, 15 wt. %, 20 wt. %, 25 wt. %, 30 wt. %, 35 wt. %, 40 wt. %, 45 wt. %, or about 50 wt. % of the compatibilizer composition.

In various embodiments, the polyether can have the structure

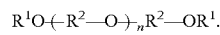

$$R^1O-(R^2-O-)_nR^2-OR^1.$$

The variable $R^1$, at each occurrence can be independently chosen from —H, —CH$_3$, and —CH$_2$CH$_3$. The variable $R^2$, at each occurrence, can be independently be chosen from substituted or unsubstituted ($C_1$-$C_5$) hydrocarbylene. The variable n can be an integer chosen such that the polyether has an $M_n$ of about 100 to 10,000. In some embodiments, the variable n can be an integer chosen such that the polyether has an $M_n$ of 100 to 9,000, 100-8,000, 100-7,000, 100-6,000, 100-5,000, 100 to 4,000 or about 100, 200, 300, 400, 600, 800, 1,000, 1,500, 2,000, 3,000, 4,000, 5,000, 6,000, 7,000, 8,000, 9,000, or about 10,000.

In some embodiments, the variable $R^1$ can be —H. The variable $R^2$, at each occurrence can be independently chosen from —CH(CH$_3$)CH$_2$— and —CH$_2$CH$_2$—. In some embodiments, the polyether can have the structure

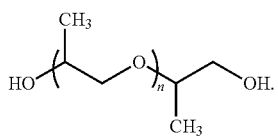

The variable n can be about 40 to about 100. The variable n can be about 60-80 or about 65-75, or about 5, 10, 15, 20, 25, 30, 35, 40, 45, 50, 55, 60, 65, 70, 75, 80, 85, 90, 95, or about 100. In some embodiments, the variable n can be an integer, and can be chosen such that the polyether has an $M_n$ of about 425, 725, 1,000, 2,000, 3000 or about 4,000.

In various embodiments, the compatibilizer composition includes a silica. The silica can be about 1 wt. % to about 20 wt. % of the compatibilizer composition. In some embodiments, the silica can be about 8 wt. % to about 12 wt. % of the compatibilizer composition. In some embodiments, the silica can be about 1-20 wt. %, 2-18 wt. %, 4-16 wt. %, 6-14 wt. %, or about 8-12 wt. %, or 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. %, or about 20 wt. % of the compatibilizer composition.

In various embodiments, the silica can be a silane-treated silica. In some embodiments, the silica can be a polysiloxane. The polysiloxane can be a poly(di($C_1$-$C_5$)alkylsiloxane. In some embodiments, the silica can be a poly(dimethylsiloxane)-treated silica.

In various embodiments, the compatibilizer composition can include a stabilizer. In various embodiments, the stabilizer can be about 0.1 wt. % to about 5.0 wt. % of the compatibilizer composition. In some embodiments, the stabilizer can be about 0.1-5 wt. %, 0.3-4.0 wt. %, 0.5-3 wt. %, 1.0-2.0 wt. %, 1.2-1.8 wt. %, or about 1.4-1.6 wt. %, or about 0.1 wt. %, 0.2 wt. %, 0.3 wt. %, 0.4 wt. %, 0.5 wt. %, 0.6 wt. %, 0.7 wt. %, 0.8 wt. %, 0.9 wt. %, 1.0 wt. %, 1.1 wt. %, 1.2 wt. %, 1.3 wt. %, 1.4 wt. %, 1.5 wt. %, 1.6 wt. %, 1.7 wt. %, 1.8 wt. %, 1.9 wt. %, 2.0 wt. %, 2.2 wt. %, 2.4 wt. %, 2.6 wt. %, 2.8 wt. %, 3.0 wt. %, 3.5 wt. %, 4.0 wt. %, 4.5 wt. %, or about 5.0 wt. % of the compatibilizer composition.

In various embodiments, the stabilizer can be chosen from hydroquinone, catechol, hydroquinone monomethyl ether, alkyl gallates, and hindered phenols such as butylated hydroxyanisol, 4-ethoxyphenol, butylated hydroxytoluene, 4-methoxyphenol, 3-methoxyphenol, 2-tertbutyl-4methoxyphenol, 2-tert-butyl-4-methoxyphenol, 2,2-methylene-bis-(4-methyl-6-tert-butylphenol), and combinations thereof. In some embodiments, the stabilizer can include butylated hydroxytoluene.

In various embodiments, the compatibilizer composition can further include a fatty alcohol ethoxylate, a nonionic surfactant, a cationic surfactant, an anionic surfactant, a block copolymer having hydrophilic and hydrophobic segments, and combinations thereof.

The term "cationic surfactant," as used herein, refers to a surfactant, in which the total number of electrons is less than the total number of protons, giving it a net positive electrical charge. The cationic surfactant can be tetradecyltrimethylammonium bromide (TTAB).

The term "anionic surfactant," as used herein, refers to a surfactant in which the total number of electrons is greater than the total number of protons, giving it a net negative electrical charge. The anionic surfactant can be sodium lauryl sulfate.

The term "sodium dodecyl sulfate," "SDS," "NaDS," "sodium lauryl sulfate," or "SLS" refers to an organic compound with the formula $CH_3(CH_2)_{11}OSO_3^-Na^+$, having the CAS Reg. No. 151-21-3, and the chemical structure shown below:

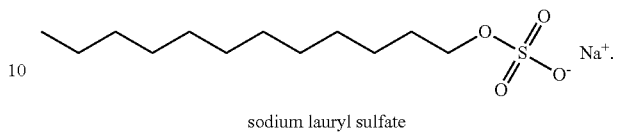

sodium lauryl sulfate

The block copolymer having hydrophilic and hydrophobic segments can be a Pluronic® polaxamer. Poloxamers can be nonionic triblock copolymers composed of a central hydrophobic chain of polyoxypropylene (poly(propylene oxide)) flanked by two hydrophilic chains of polyoxyethylene (poly(ethylene oxide)). Poloxamers are also known by the trade name Pluronics®.

Because the lengths of the polymer blocks can be customized, many different poloxamers exist, that have slightly different properties. For the generic term "poloxamer," these copolymers are commonly named with the letter "P" (for poloxamer) followed by three digits, the first two digits×100 give the approximate molecular mass of the polyoxypropylene core, and the last digit×10 gives the percentage polyoxyethylene content (e.g., P407=Poloxamer with a polyoxypropylene molecular mass of 4,000 g/mol and a 70% polyoxyethylene content). For the Pluronic® tradename, coding of these copolymers starts with a letter to define its physical form at room temperature (L=liquid, P=paste, F=flake (solid)) followed by two or three digits. The first digit (two digits in a three-digit number) in the numerical designation, multiplied by 300, indicates the approximate molecular weight of the hydrophobe; and the last digit×10 gives the percentage polyoxyethylene content (e.g., L61=Pluronic with a polyoxypropylene molecular mass of 1,800 g/mol and a 10% polyoxyethylene content). In the example given, poloxamer 181 (P181)=Pluronic® L61.

Other Components.

The composition including the compatibilized cement composition including the curable resin or a cured product thereof, the cement slurry, and the compatibilizer composition, reaction product thereof, or combination thereof, can include any suitable additional component in any suitable proportion, such that the composition including the compatibilized cement composition can be used as described herein.

In some embodiments, the composition includes one or more viscosifiers. The viscosifier can be any suitable viscosifier. The viscosifier can affect the viscosity of the composition or a solvent that contacts the composition at any suitable time and location. In some embodiments, the viscosifier provides an increased viscosity at least one of before injection into the subterranean formation, at the time of injection into the subterranean formation, during travel through a tubular disposed in a borehole, once the composition reaches a particular subterranean location, or some period of time after the composition reaches a particular subterranean location. In some embodiments, the viscosifier can be about 0.000,1 wt. % to about 10 wt % of the composition or a mixture including the same, about 0.004 wt. % to about 0.01 wt. %, or about 0.000,1 wt. % or less, 0.000,5 wt. %, 0.001, 0.005, 0.01, 0.05, 0.1, 0.5, 1, 2, 3, 4, 5, 6, 7, 8, 9, or about 10 wt. % or more of the composition or a mixture including the same.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly(($C_2$-$C_{10}$)alkene), wherein the ($C_2$-$C_{10}$) alkene is substituted or unsubstituted. The viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly(hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, cellulose, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted ($C_2$-$C_{50}$)hydrocarbyl having at least one aliphatic unsaturated C—C bond therein, and a substituted or unsubstituted ($C_2$-$C_{50}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethyl-pentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen containing substituted or unsubstituted ($C_1$-$C_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly(vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the composition can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a ($C_1$-$C_{20}$)alkylenebiacrylamide (e.g., methylenebisacrylamide), a poly(($C_1$-$C_{20}$)alkenyl)-substituted mono- or poly-($C_1$-$C_{20}$)alkyl ether (e.g., pentaerythritol allyl ether), and a poly($C_2$-$C_{20}$)alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000,01 wt. % to about 5 wt. % of the composition, compatibilized cement composition, cement slurry, or compatibilizer composition or a mixture including the same, about 0.001 wt. % to about 0.01 wt. %, or about 0.000,01 wt. % or less, or about 0.000,05 wt. %, 0.000,1, 0.000,5, 0.001, 0.005, 0.01, 0.05, 0.1, 0.5, 1, 2, 3, 4, or about 5 wt. % or more.

In some embodiments, the composition can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a persulfate, percarbonate, perborate, peroxide, perphosphate, permanganate, chlorite, or hyporchlorite ion. An enzymatic breaker can be at least one of an alpha or beta amylase, amyloglucosidase, oligoglucosidase, invertase, maltase, cellulase, hemi-cellulase, and mannanohydrolase. The breaker can be about 0.001 wt. % to about 30 wt. % of the composition, compatibilized cement composition, cement slurry, or compatibilizer composition or a mixture including the same, or about 0.01 wt. % to about 5 wt. %, or about 0.001 wt. % or less, or about 0.005 wt. %, 0.01, 0.05, 0.1, 0.5, 1, 2, 3, 4, 5, 6, 8, 10, 12, 14, 16, 18, 20, 22, 24, 26, 28, or about 30 wt. % or more.

The composition, or a mixture including the composition, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt. % to about 99.999 wt. % of the composition, or a mixture including the same, or about 0.001 wt. % or less, 0.01 wt. %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt. % or more.

The composition or a mixture including the same can include any suitable downhole fluid. The composition including the compatibilized cement composition, including the curable resin or a cured product thereof, cement slurry, or compatibilizer composition, reaction product thereof, or combination thereof can be combined with any suitable downhole fluid before, during, or after the placement of the composition in the subterranean formation or the contacting of the composition and the subterranean material. In some examples, the composition is combined with a downhole fluid above the surface, and then the combined composition is placed in a subterranean formation or contacted with a subterranean material. In another example, the composition is injected into a subterranean formation to combine with a downhole fluid, and the combined composition is contacted with a subterranean material or is considered to be placed in the subterranean formation. The placement of the composition in the subterranean formation can include contacting the subterranean material and the mixture. Any suitable weight percent of the composition or of a mixture including the same that is placed in the subterranean formation or contacted with the subterranean material can be the downhole fluid, such as about 0.001 wt. % to about 99.999 wt. %, about 0.01 wt. % to about 99.99 wt. %, about 0.1 wt. % to about 99.9 wt. %, about 20 wt. % to about 90 wt. %, or about 0.001 wt. % or less, or about 0.01 wt. %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt. %, or about 99.999 wt. % or more of the composition.

In some embodiments, the composition, or a mixture including the same, can include any suitable amount of any suitable material used in a downhole fluid. For example, the composition or compatibilized cement composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. In various embodiments, the composition, compatibilized cement composition, cement slurry, or compatibilizer composition or a mixture including the same can include one or more additive components such as: COLDTROL®, ATC®, OMC 2™, and OMC 42™ thinner additives; RHEMOD™ viscosifier and suspension agent; TEMPERUS™ and VIS-PLUS® additives for providing temporary increased viscosity; TAU-MOD™ viscosifying/suspension agent; ADAPTA®, DURATONE® HT, THERMO TONE™, BDF™-366, and BDF™-454 filtration control agents; LIQUITONE™ polymeric filtration agent and viscosifier; FACTANT™ emulsion stabilizer; LE SUPERMUL™, EZ MUL® NT, and FORTI-MUL® emulsifiers; DRIL TREAT® oil wetting agent for heavy fluids; BARACARB® bridging agent; BAROID® weighting agent; BAROLIFT® hole sweeping agent; SWEEP-WATE® sweep weighting agent; BDF-508 rheology modifier; and GELTONE® II organophilic clay. In various embodiments, the composition, compatibilized cement composition, cement slurry, or compatibilizer composition or a mixture including the same can include one or more additive components such as: X-TEND® II, PAC™-R, PAC™-L, LIQUI-VIS® EP, BRINEDRIL-VIS™, BARA-ZAN®, N-VIS®, and AQUAGEL® viscosifiers; THERMA-CHEK®, N-DRIL™, N-DRIL™ HT PLUS, IMPERMEX®, FILTERCHEK™, DEXTRID®, CARBONOX®, and BARANEX® filtration control agents; PERFORMATROL®, GEM™, EZ-MUD®, CLAY GRABBER®, CLAYSEAL®, CRYSTAL-DRIL®, and CLAY SYNC™ II shale stabilizers; NXS-LUBE™, EP MUD-LUBE®, and DRIL-N-SLIDE™ lubricants; QUIK-THIN®, IRON-THIN™, and ENVIRO-THIN™ thinners; SOURSCAV™ scavenger; BARACOR® corrosion inhibitor; and WALL-NUT®, SWEEP-WATE®, STOPPIT™, PLUG-GIT®, BARACARB®, DUO-SQUEEZE®, BARO-FIBRE™, STEELSEAL®, and HYDRO-PLUG® lost circulation management materials. Any suitable proportion of the composition or compatibilized cement composition or mixture including the composition and compatibilized cement composition can include any optional component listed in this paragraph, such as about 0.001 wt. % to about 99.999 wt. %, about 0.01 wt. % to about 99.99 wt. %, about 0.1 wt. % to about 99.9 wt. %, about 20 to about 90 wt. %, or about 0.001 wt. % or less, or about 0.01 wt. %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt. %, or about 99.999 wt. % or more of the composition or compatibilized cement composition or mixture.

A cement fluid can include an aqueous mixture of at least one of cement and cement kiln dust. The composition including the compatibilized cement composition can form a useful combination with cement or cement kiln dust. The cement kiln dust can be any suitable cement kiln dust. Cement kiln dust can be formed during the manufacture of cement and can be partially calcined kiln feed that is removed from the gas stream and collected in a dust collector during a manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with embodiments of the present invention; for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in embodiments of the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt. % to about 100 wt. %, about 0 wt. % to about 95 wt. %, about 20 wt. % to about 95 wt. %, or about 50 wt. % to about 90 wt. %. A cement kiln dust can be present in an amount of at least about 0.01 wt. %, or about 5 wt. % to about 80 wt. %, or about 10 wt. % to about 50 wt. %.

Optionally, other additives can be added to a cement or kiln dust-containing composition of embodiments of the present invention as deemed appropriate by one skilled in the art, with the benefit of this disclosure. Any optional ingredient listed in this paragraph can be either present or not present in the composition. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

System or Apparatus.

In various embodiments, the present invention provides a system. The system can be any suitable system that can use or that can be generated by use of an embodiment of the composition described herein in a subterranean formation, or that can perform or be generated by performance of a method for using the composition described herein. The system can include a compatibilized cement composition. In various embodiments, the compatibilized cement composition includes a curable resin or a cured product thereof, a cement slurry, and a compatibilizer composition, a reaction product thereof, or a combination thereof. In various embodiments, the compatibilizer composition includes a substituted or unsubstituted $C_5$-$C_{50}$ hydrocarbon including at least one internal olefin and a polyether. The system can also include a subterranean formation including the composition therein. In some embodiments, the composition in the system can also include a downhole fluid, or the system can include a mixture of the composition and downhole fluid. In some embodiments, the system can include a tubular, and a pump configured to pump the composition into the subterranean formation through the tubular.

Various embodiments provide systems and apparatus configured for delivering the composition described herein to a subterranean location and for using the composition therein, such as for a drilling operation, a cementing operation, a fracturing operation (e.g., pre-pad, pad, slurry, or finishing stages). In various embodiments, the system or apparatus can include a pump fluidly coupled to a tubular (e.g., any suitable type of oilfield pipe, such as pipeline, drill pipe, production tubing, and the like), with the tubular containing a composition including the compatibilized cement composition described herein.

In some embodiments, the system can include a drill string disposed in a wellbore, with the drill string including a drill bit at a downhole end of the drill string. The system can also include an annulus between the drill string and the wellbore. The system can also include a pump configured to circulate the composition through the drill string, through the drill bit, and back above-surface through the annulus. In some embodiments, the system can include a fluid processing unit configured to process the composition exiting the annulus to generate a cleaned drilling fluid for recirculation through the wellbore.

In various embodiments, the present invention provides an apparatus. The apparatus can be any suitable apparatus that can use or that can be generated by use of the compatibilized cement composition described herein in a subterranean formation, or that can perform or be generated by performance of a method for using the compatibilized cement composition described herein.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery to the subterranean formation.

FIG. 1 shows an illustrative schematic of systems and apparatuses that can deliver embodiments of the compositions of the present invention to a subterranean location, according to one or more embodiments. It should be noted that while FIG. 1 generally depicts a land-based system or apparatus, it is to be recognized that like systems and apparatuses can be operated in subsea locations as well. Embodiments of the present invention can have a different scale than that depicted in FIG. 1. As depicted in FIG. 1, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 1 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 1, at least part of the composition can, in some embodiments, flow back to wellhead 14 and exit subterranean formation 18. In some embodiments, the composition that has flowed back to wellhead 14 can subsequently be recovered, and in some examples reformulated, and recirculated to subterranean formation 18.

It is also to be recognized that the disclosed composition can also directly or indirectly affect the various downhole or subterranean equipment and tools that can come into contact with the composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 1.

Composition for Treatment of a Subterranean Formation.

Various embodiments provide a composition for treatment of a subterranean formation. The composition can be any suitable composition that can be used to perform an embodiment of the method for treatment of a subterranean formation described herein.

In various embodiments, the composition can include a compatibilized cement composition. The compatibilized cement composition can include a curable resin or cured product, a cement slurry and a compatibilizer composition, a reaction product thereof, or a combination thereof. The compatibilizer composition can include a substituted or unsubstituted $C_5$-$C_{50}$ hydrocarbon including at least one internal olefin and a polyether.

In various embodiments, the composition can include a compatibilized cement composition. The compatibilized cement composition can include a curable resin or cured product thereof, a cement slurry and a compatibilizer composition. The curable resin or cured product thereof can include diglycidyl ether bisphenol A resin, butyl glycidyl ether, cyclohexane methanol diglycidyl ether, diethyl toluene diamine, 2,4,6-tris(dimethylaminomethyl)phenol and be about 1% to about 50% by volume of the composition. The cement slurry can include class G cement, water, and hydroxyl ethyl cellulose and be about 50% to about 99% by volume of the composition. The compatibilizer composition can include a $C_{15}$-$C_{18}$ alkene with at least one internal olefin; a polyether having the structure

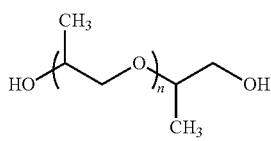

wherein n is about 40 to about 100. The compatibilizer composition can further include a silica including poly(dimethylsiloxane) treated silica and a stabilizer comprising butylated hydroxytoluene. The compatibilizer composition can be about 0.01% to about 5.0% by weight of water.

Method of Preparing a Compatibilized Cement Composition for Treatment of a Subterranean Formation.

In various embodiments, the present invention provides a method for preparing a composition for treatment of a subterranean formation. The method can be any suitable method that produces a composition described herein. In some embodiments, the method can include forming a composition comprising a compatibilized cement composition. The compatibilized cement composition can include a curable resin or cured product thereof, a cement slurry, and a compatibilizer composition, a reaction product thereof, or a combination thereof. The compatibilizer composition can include a substituted or unsubstituted $C_5$-$C_{50}$ hydrocarbon including at least one internal olefin and a polyether. The compatibilizer composition can further include a silica and a stabilizer. The method of preparing a compatibilized cement composition for treatment of a subterranean formation can further include mixing the cement slurry and compatibilizer composition. The method of preparing a compatibilized cement composition for treatment of a subterranean formation can further include mixing the curable resin or cured product thereof with the cement slurry and compatibilizer composition.

EXAMPLES

Various embodiments of the present invention can be better understood by reference to the following Examples which are offered by way of illustration. The present invention is not limited to the Examples given herein.

Example 1: Preparation of Compatibilized Cement Compositions

The compatibilizer composition was prepared from a mixture of internal olefins including $C_{15}$-$C_{18}$ alkenes with at least one internal olefin (59.5 wt. %), polypropylene glycol (30.0 wt. %), butylated hydroxyl toluene (1.4 wt. %), and PDMS-treated silica (9.1 wt. %).

The cured resin was prepared by mixing diglycidyl ether bisphenol A resin (271.5 g) with butyl glycidyl ether (28.5 g). Subsequently, cyclohexane methanol diglycidyl ether (100 g) was added to the mixture. Next, diethyl toluene diamine (116 g) was added to the mixture. Then, 2,4,6-tris(dimethylaminomethyl)phenol (15 g) was added to the mixture.

The cement slurry was prepared from Class G cement (100% by weight of cement), water (45.11% by weight of cement), and hydroxyl ethyl cellulose (0.20% by weight of cement). Subsequently, the compatibilizer composition described above was added to the cement slurry (0.10% by weight of water).

The compatibilized cement compositions (e.g., samples 1-6) were then prepared by mixing the cement slurry containing the compatibilizer composition with varying amounts of cured resin. The compatibilized cement compositions prepared are listed in Table 1.

TABLE 1

Compatibilized cement compositions.

| Sample | Cement slurry containing compatibilizer compostion (in volume fraction) | Cured resin (in volume fraction) |
|---|---|---|
| 1 | 1.0 | 0 |
| 2 | 0.95 | 0.05 |
| 3 | 0.75 | 0.25 |
| 4 | 0.50 | 0.50 |
| 5 | 0.25 | 0.75 |
| 6 | 0.05 | 0.95 |
| 7 | 0 | 1 |

Example 2: Preparation of Cement Compositions

The cured resin was prepared as described in Example 1. The cement slurry was prepared from Class G cement (100% by weight of cement), water (45.11% by weight of cement) and hydroxyl ethyl cellulose (0.20% by weight of cement). The cement compositions (e.g. samples 8-14) were then prepared by mixing the cement slurry with varying amounts of cured resin. The cement compositions prepared are listed in Table 2.

TABLE 2

Cement compositions without a compatibilizer composition.

| Sample | Cement (in volume fraction) | Cured resin (in volume fraction) |
|---|---|---|
| 8 | 1.0 | 0 |
| 9 | .95 | .05 |
| 10 | 0.75 | 0.25 |
| 11 | 0.50 | 0.50 |
| 12 | 0.25 | 0.75 |
| 13 | 0.05 | 0.95 |
| 14 | 0 | 1 |

Figure 2:
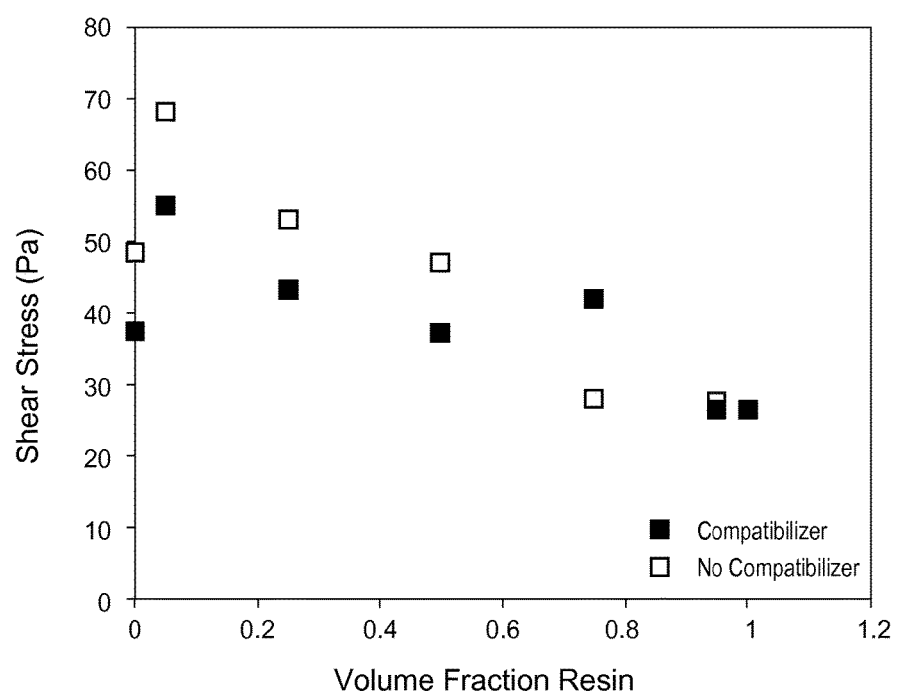
FIG. 2 illustrates the influence of a compatibilizer composition on the rheology of a cured resin and cement slurry, in accordance with various embodiments.

Example 3: Analysis of Cured Resin Cement With and Without the Compatibilizer Composition The rheology of the prepared compatibilized cement compositions was compared to the rheology of corresponding cement compositions without compatibilizer composition. The rheology of the prepared compatibilized cement compositions and cement compositions was measured using a viscometer. The results are shown in FIG. 2. FIG. 2 illustrates shear stress plotted versus the volume fraction at a constant shear rate of 69 s$^{-1}$, at room temperature, for the prepared compatibilized cement compositions (e.g., samples 1-6; shown as black squares) and cement compositions without compatibilizer compositions (e.g., samples 8-14; shown as white squares). FIG. 2 illustrates that a reduction in rheology is observed in compatibilized cement compositions when the fraction of epoxy resin in the mixture is 0.5 or less.

Figure 3A:
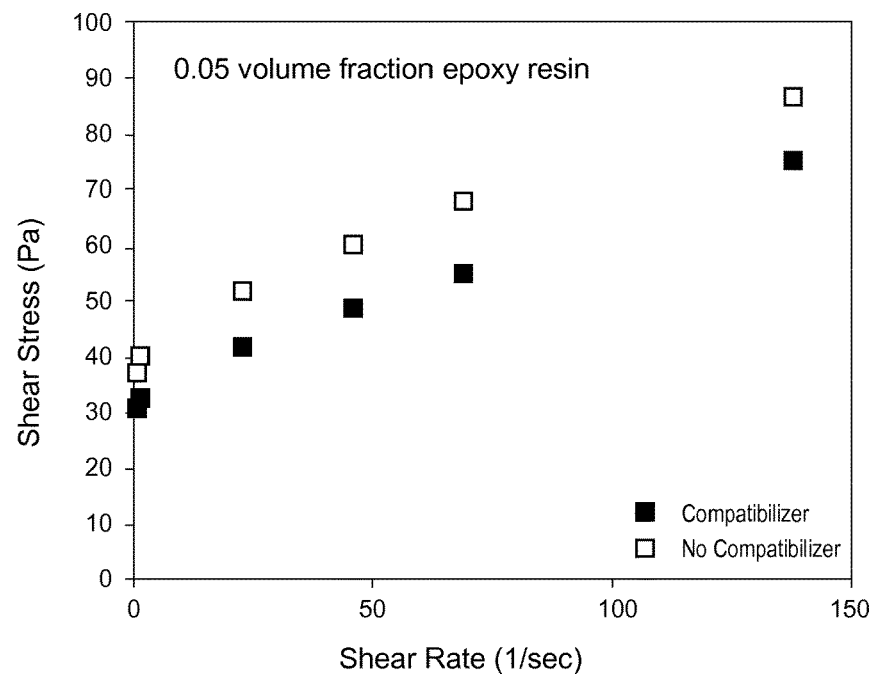
FIGS. 3A and 3B illustrate the reduction is shear stress as a function of shear rate for compatibilized cement compositions and a corresponding cement composition without a compatibilizer composition, in accordance with various embodiments.
Figure 3B:
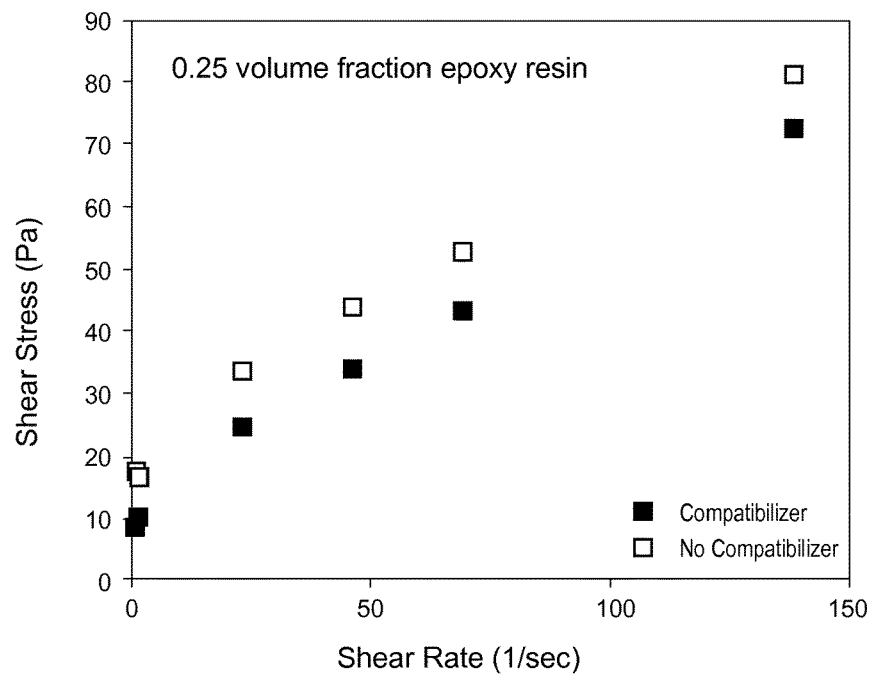

Next, the shear stress as a function of shear rate was examined for both the prepared compatibilized cement compositions and the prepared cement compositions without compatibilizer compositions at room temperature. FIG. 3A illustrates the reduction in shear stress as a function of shear rate for the prepared compatibilized cement composition including 5% cured resin (e.g., sample 2; represented by the black squares) and for the prepared cement composition without a compatibilizer composition including 5% cured resin (e.g. sample 9; represented by the white squares). FIG. 3B illustrates the reduction in shear stress as a function of shear rate for the prepared compatibilized cement composition including 25% cured resin (e.g., sample 3; represented by the black squares) and for the prepared cement composition without a compatibilizer composition including 25% cured resin (e.g. sample 10; represented by the white squares). The results in figure FIGS. 3A and 3B demonstrate that the observed reductions in shear stress are independent of shear rate.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides for a method of treating a subterranean formation, the method comprising:
placing in a subterranean formation a composition comprising a compatibilized cement composition comprising:
a curable resin or a cured product thereof;
a cement slurry; and
a compatibilizer composition, a reaction product thereof, or a combination thereof, the compatibilizer composition comprising
a substituted or unsubstituted $C_5$-$C_{50}$ hydrocarbon including at least one internal olefin, and
a polyether.

Embodiment 2 provides for the method of Embodiment 1, wherein the curable resin or cured product thereof is less than about 50% by volume of the compatibilized cement composition.

Embodiment 3 provides for any one of Embodiments 1-2, wherein the curable resin or cured product thereof is less than about 25% by volume of the compatibilized cement composition.

Embodiment 4 provides for any one of Embodiments 1-3, wherein the curable resin or cured product thereof includes an epoxy resin.

Embodiment 5 provides for any one of Embodiments 1-4, wherein the curable resin or cured product thereof further includes an amine hardener.

Embodiment 6 provides for any one of Embodiments 1-5, wherein the epoxy resin is about 50 wt. % to about 99 wt. % of the curable resin.

Embodiment 7 provides for any one of Embodiments 1-6, wherein the epoxy resin is chosen from cycloaliphatic epoxides, bis(3,4-epoxycyclohexylmethyl)adipate, bis(3,4-epoxy-6-methylcyclohexyl-methyl)adipate, bis(3,4-epoxy-cyclohexylmethyl)pimelate, cyclohexane methanol diglycidyl ether, 3,4-epoxycyclohexylmethyl-3,4-epoxycyclohexane carboxylate, 3,4-epoxy-1-methylcyclohexylmethyl-3,4-epoxycyclohexane carboxylate, 3,4-epoxy-1-methylcyclohexylmethyl-3,4-epoxy-1-methylcyclohexane carboxylate, 6-methyl-3,4-epoxycyclohexylmethyl-6-methyl-3,4-epoxycyclohexane carboxylate, 3,4-epoxy-3-methylcyclohexylmethyl-3,4-epoxy-3-methylcyclohexane carboxylate, 3,4-epoxy-5-methylcyclohexylmethyl-3,4-epoxy-5-methylcyclohexane carboxylate, 2-(3,4-epoxycyclohexyl-5,5-spiro-3,4-epoxy) cyclohexane-meta-dioxane, glycidyl epoxides, aliphatic epoxides, epoxy cresol novolac resins, epoxy phenol novolac resins, polynuclear phenol glycidyl ether-derived resins, aromatic glycidyl amine resins, heterocyclic glycidyl amine resins, hydantoin epoxy resins, natural oils epoxides, soybean oil epoxides, linseed oil epoxides, diglycidyl ether bisphenol A resin, bisphenol A diglycidyl ether, butyl glycidyl ether, and combinations thereof.

Embodiment 8 provides for any one of Embodiments 1-7, wherein the epoxy resin is chosen from diglycidyl ether bisphenol A resin, butyl glycidyl ether, cyclohexane methanol diglycidyl ether, and combinations thereof.

Embodiment 9 provides for any one of Embodiments 1-8, wherein the amine hardener is about 1 wt. % to about 50 wt. % of the curable resin.

Embodiment 10 provides for any one of Embodiments 1-9, wherein the amine hardener is chosen from aliphatic amines, aliphatic tertiary amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, N-aminophenyl piperazine, imidazoline, 1,2-diaminocyclohexane, polytheramine, diethyl toluene diamine, 2,4,6-tris(dimethylaminomethyl)phenol, 4,4'-diaminodiphenyl methane, methyltetrahydrophthalic anhydride, hexahydrophthalic anhydride, maleic anhydride, polyazelaic polyanhydride, phthalic anhydride, piperazine, aminoethylpiperazine, 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, β-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexamethylene imine, indazole, amines, bis-amines, tris-amines, aromatic amines, polyamines, aliphatic amines, cyclo-aliphatic amines, amides, polyamides, 2-ethyl-4-methyl imidazole, bis(methylthio)-toluene diamine, 1,1,3-trichlorotrifluoroacetone and combinations thereof.

Embodiment 11 provides for any one of Embodiments 1-10, wherein the amine hardener is chosen from diethyl toluene diamine, 2,4,6-tris(dimethylaminomethyl)phenol, bis(methylthio)-toluene diamine and combinations thereof.

Embodiment 12 provides for any one of Embodiments 1-11, wherein the cement slurry is greater than about 50% by volume of the compatibilized cement composition.

Embodiment 13 provides for any one of Embodiments 1-12, wherein the cement slurry is about 85-99% by volume of the compatibilized cement composition.

Embodiment 14 provides for any one of Embodiments 1-13, wherein the cement slurry is about 65-85% by volume of the compatibilized cement composition.

Embodiment 15 provides for any one of Embodiments 1-14, wherein the cement slurry comprises a cement and water.

Embodiment 16 provides for any one of Embodiments 1-15, wherein the cement comprises Portland cement, pozzolana cement, gypsum cement, high alumina content cement, slag cement, silica cement, pumice, perlite, and combinations thereof.

Embodiment 17 provides for any one of Embodiments 1-16, wherein the cement comprises Portland cement.

Embodiment 18 provides for any one of Embodiments 1-17, wherein the Portland cement comprises a Class G cement.

Embodiment 19 provides for any one of Embodiments 1-18, wherein the water is about 30% to about 60% by weight of cement.

Embodiment 20 provides for any one of Embodiments 1-19, wherein the cement slurry further comprises a thickener.

Embodiment 21 provides for any one of Embodiments 1-20, wherein the thickener is about 0.01% to about 2.0% by weight of cement.

Embodiment 22 provides for any one of Embodiments 1-21, wherein the thickener is chosen from poly(acrylic acid) or $(C_1-C_5)$alkyl esters thereof, poly(methacrylic acid) or $(C_1-C_5)$alkyl esters thereof, poly(vinyl acetate), poly(vinyl alcohol), poly(ethylene glycol), poly(vinyl pyrrolidone), polyacrylamide, poly (hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum, gum ghatti, gum arabic, locust bean gum, cellulose, and derivatized cellulose.

Embodiment 23 provides for any one of Embodiments 1-22, wherein the thickener is hydroxyl ethyl cellulose.

Embodiment 24 provides for any one of Embodiments 1-23, wherein the compatibilizer composition is about 0.01 to about 5.0% by weight of water.

Embodiment 25 provides for any one of Embodiments 1-24, wherein the compatibilizer composition is about 0.1% by weight of water.

Embodiment 26 provides for any one of Embodiments 1-25, wherein the substituted or unsubstituted $C_5-C_{50}$ hydrocarbon with at least one internal olefin is about 20 wt. % to about 90 wt. % of the compatibilizer composition.

Embodiment 27 provides for any one of Embodiments 1-26, wherein the substituted or unsubstituted $C_5-C_{50}$ hydrocarbon with at least one internal olefin is about 50 wt. % to about 70 wt. % of the compatibilizer composition.

Embodiment 28 provides for any one of Embodiments 1-27, wherein the substituted or unsubstituted $C_5-C_{50}$ hydrocarbon with at least one internal olefin is a $C_{10}-C_{30}$ alkene with at least one internal olefin.

Embodiment 29 provides for any one of Embodiments 1-28, wherein the substituted or unsubstituted $C_5-C_{50}$ hydrocarbon with at least one internal olefin is a $C_{15}-C_{18}$ alkene with at least one internal olefin.

Embodiment 30 provides for any one of Embodiments 1-29, wherein the polyether is about 10 wt. % to about 50 wt. % of the compatibilizer composition.

Embodiment 31 provides for any one of Embodiments 1-30, wherein the polyether is about 25 wt. % to about 35 wt. % of the compatibilizer composition.

Embodiment 32 provides for any one of Embodiments 1-31, wherein the polyether has the structure $$R^1O-(R^2-O)_n-R^2-OR^1$$

wherein
at each occurrence $R^1$ is independently chosen from —H, —$CH_3$, and —$CH_2CH_3$,
at each occurrence $R^2$ is independently a substituted or unsubstituted $(C_1-C_5)$ hydrocarbylene, and
n is an integer chosen such that the ether has an $M_n$ of 100 to 10,000.

Embodiment 33 provides for any one of Embodiments 1-32, wherein
$R^1$ is —H, and
at each occurrence $R^2$ is independently chosen from —CH($CH_3$)$CH_2$— and —$CH_2CH_2$—.

Embodiment 34 provides for any one of Embodiments 1-33, wherein the polyether has the structure

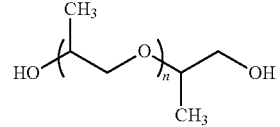

wherein n is about 40 to about 100.

Embodiment 35 provides for any one of Embodiments 1-34, wherein the compatibilizer composition further comprises a silica.

Embodiment 36 provides for any one of Embodiments 1-35, wherein the silica is about 1 wt. % to about 20 wt. % of the compatibilizer composition.

Embodiment 37 provides for any one of Embodiments 1-36, wherein the silica is about 8 wt. % to about 12 wt. % of the compatibilizer composition.

Embodiment 38 provides for any one of Embodiments 1-37, wherein the silica is a silane-treated silica.

Embodiment 39 provides for any one of Embodiments 1-38, wherein the silica is a poly(dimethylsiloxane)-treated silica.

Embodiment 40 provides for any one of Embodiments 1-39, wherein the compatibilizer composition further comprises a stabilizer.

Embodiment 41 provides for any one of Embodiments 1-40, wherein the stabilizer is about 0.1 wt. % to about 5.0 wt. % of the compatibilizer composition.

Embodiment 42 provides for any one of Embodiments 1-41, wherein the stabilizer is about 1.0 wt. % to about 2.0 wt. % of the compatibilizer composition.

Embodiment 43 provides for any one of Embodiments 1-42, wherein the stabilizer is chosen from hydroquinone, catechol, hydroquinone monomethyl ether, alkyl gallates, and hindered phenols such as butylated hydroxyanisol; 4-ethoxyphenol; butylated hydroxytoluene, 4-methoxyphenol; 3-methoxyphenol; 2-tertbutyl-4methoxyphenol; 2-tert-butyl-4-methoxyphenol; 2,2-methylene-bis-(4-methyl-6-tert-butylphenol) and combinations thereof.

Embodiment 44 provides for any one of Embodiments 1-43, wherein the stabilizer is butylated hydroxytoluene.

Embodiment 45 provides for any one of Embodiments 1-44, wherein the compatibilizer composition further comprises a fatty alcohol ethoxylate, a nonionic surfactant, a cationic surfactant, an anionic surfactant, a block copolymer having hydrophilic and hydrophobic segments, and combinations thereof.

Embodiment 46 provides for any one of Embodiments 1-45, wherein the shear stress of the compatibilized cement composition is less than that of a corresponding composition without the compatibilizer composition.

Embodiment 47 provides for any one of Embodiments 1-46, wherein a compatibilized cement composition comprising about 5% by volume of the curable resin or cured product thereof, about 95% by volume of the cement slurry, and about 0.1% by weight of water of the compatibilizer composition provides a reduction in shear stress of about 10 Pa to about 40 Pa as compared to a correspond composition that is free of the compatibilizer composition at a shear rate of about 1 $s^{-1}$ to about 140 $s^{-1}$ at standard temperature and pressure.

Embodiment 48 provides for any one of Embodiments 1-47, wherein a compatibilized cement composition comprising about 5% by volume of the curable resin or cured product thereof, about 95% by volume of the cement slurry, and about 0.1% by weight of water of the compatibilizer composition provides a reduction in shear stress of about 10 Pa to about 40 Pa as compared to a correspond composition that is free of the compatibilizer composition at a shear rate of about 69 $s^{-1}$ at standard temperature and pressure.

Embodiment 49 provides for any one of Embodiments 1-48, wherein a compatibilized cement composition comprising about 25% by volume of the curable resin or cured product thereof, about 75% by volume of the cement slurry, and about 0.1% by weight of water of the compatibilizer composition provides a reduction in shear stress of about 10 Pa to about 40 Pa as compared to a correspond composition that is free of the compatibilizer composition at a shear rate of about 1 $s^{-1}$ to about 140 $s^{-1}$ at standard temperature and pressure.

Embodiment 50 provides for any one of Embodiments 1-49, wherein a compatibilized cement composition comprising about 25% by volume of the curable resin or cured product thereof, about 75% by volume of the cement slurry, and about 0.1% by weight of water of the compatibilizer composition provides a reduction in shear stress of about 10 Pa to about 40 Pa as compared to a correspond composition that is free of the compatibilizer composition at a shear rate of about 69 $s^{-1}$ at standard temperature and pressure.

Embodiment 51 provides for any one of Embodiments 1-50, wherein the method further comprises obtaining or providing the composition, wherein the obtaining or providing of the composition occurs above-surface.

Embodiment 52 provides for any one of Embodiments 1-51, wherein the method further comprises obtaining or providing the composition, wherein the obtaining or providing of the composition occurs in the subterranean formation.

Embodiment 53 provides for any one of Embodiments 1-52, further comprising combining the composition with an aqueous or oil-based fluid comprising a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof, to form a mixture, wherein the placing the composition in the subterranean formation comprises placing the mixture in the subterranean formation.

Embodiment 54 provides for any one of Embodiments 1-53, wherein the composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, fly ash, metakaolin, shale, zeolite, a crystalline silica compound, amorphous silica, fibers, a hydratable clay, microspheres, pozzolan lime, or a combination thereof.

Embodiment 55 provides for any one of Embodiments 1-54, wherein the composition further comprises a proppant, a resin-coated proppant, or a combination thereof.

Embodiment 56 provides for any one of Embodiments 1-55, wherein the placing of the composition in the subterranean formation comprises pumping the composition through a tubular disposed in a wellbore and into the subterranean formation.

Embodiment 57 provides for a method of treating a subterranean formation, the method comprising:
  placing in a subterranean formation a composition comprising a compatibilized cement composition comprising:
    a curable resin or cured product thereof comprising diglycidyl ether bisphenol A resin, butyl glycidyl ether, cyclohexane methanol diglycidyl ether, diethyl toluene diamine, and 2,4,6-tris(dimethylaminomethyl)phenol, wherein the curable resin or cured product thereof is about 1% to about 50% by volume of the compatibilized cement composition;
    a cement slurry comprising a class G cement, water, and hydroxyl ethyl cellulose, wherein the cement slurry is about 50% to about 99% by volume of the compatibilized cement composition; and
    a compatibilizer composition, a reaction product thereof, or a combination thereof, the compatibilizer composition
      a $C_{15}$-$C_{18}$ alkene with at least one internal olefin,
      a polyether having the structure

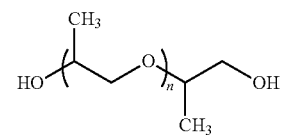

wherein n is about 40 to about 100,
      wherein the compatibilizer composition is about 0.01% to about 5.0% by weight of water.

Embodiment 58 provides the method of Embodiment 57, wherein the compatibilizer composition further comprises poly(dimethylsiloxane) treated silica and butylated hydroxytoluene.

Embodiment 59 provides for a system for performing the method of claim 1, the system comprising:
a tubular disposed in the subterranean formation; and
a pump configured to pump the composition in the subterranean formation through the tubular.

Embodiment 60 provides for a system comprising:
a composition comprising a compatibilized cement composition comprising:
a curable resin or cured product thereof;
a cement slurry; and
a compatibilizer composition, a reaction product thereof, or a combination thereof, the compatibilizer composition comprising
a substituted or unsubstituted $C_5$-$C_{50}$ hydrocarbon including at least one internal olefin, and
a polyether; and
a subterranean formation comprising the composition therein.

Embodiment 61 provides the system of Embodiment 60, further comprising a tubular disposed in the subterranean formation; and
a pump configured to pump the composition in the subterranean formation through the tubular.

Embodiment 62 provides for a composition for treatment of a subterranean formation, the composition comprising a compatibilized cement composition comprising:
a curable resin or cured product thereof;
a cement slurry; and
a compatibilizer composition, a reaction product thereof, or a combination thereof, the compatibilizer composition comprising
a substituted or unsubstituted $C_5$-$C_{50}$ hydrocarbon including at least one internal olefin, and
a polyether.

Embodiment 63 provides for a composition for treatment of a subterranean formation, the composition comprising a compatibilized cement composition comprising:
a curable resin or cured product thereof comprising diglycidyl ether bisphenol A resin, butyl glycidyl ether, cyclohexane methanol diglycidyl ether, diethyl toluene diamine, and 2,4,6-tris(dimethylaminomethyl)phenol, wherein the curable resin or cured product thereof is about 1% to about 50% by volume of the compatibilized cement;
a cement slurry comprising class G cement, water, and hydroxyl ethyl cellulose;
wherein the cement slurry is about 50% to about 99% by volume of the compatibilized cement; and
a compatibilizer composition, a reaction product thereof, or a combination thereof, the compatibilizer composition comprising
a $C_{15}$-$C_{18}$ alkene with at least one internal olefin, and
a polyether having the structure

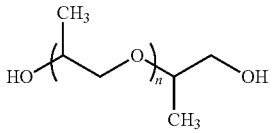

wherein n is about 40 to about 100,
wherein the compatibilizer composition is about 0.01% to about 5.0 by weight of water.

Embodiment 64 provides for a method of preparing a composition for treatment of a subterranean formation, the method comprising:
forming a composition comprising a compatibilized cement composition comprising
mixing a cement slurry and a compatibilizer composition, a reaction product thereof, or a combination thereof, the compatibilizer composition comprising,
a substituted or unsubstituted $C_5$-$C_{50}$ hydrocarbon including at least one internal olefin, and
a polyether;
mixing a curable resin or cured product thereof with the mixed cement slurry and compatibilizer composition.

What is claimed is:

1. A method of treating a subterranean formation, comprising:
placing a composition comprising a compatibilized cement composition into the subterranean formation, the compatibilized cement composition comprising:
a curable resin or a cured product thereof comprising an epoxy resin and an amine hardener;
a cement slurry; and
a compatibilizer composition, a reaction product thereof, or a combination thereof, the compatibilizer composition comprising:
a substituted or unsubstituted $C_5$-$C_{50}$ hydrocarbon including at least one internal olefin, and
a polyether.

2. The method of claim 1, wherein the epoxy resin is about 50 wt % to about 99 wt % of the curable resin or cured product thereof, and wherein the epoxy resin is chosen from diglycidyl ether bisphenol A resin, butyl glycidyl ether, cyclohexane methanol diglycidyl ether, and combinations thereof.

3. The method of claim 1, wherein the amine hardener is about 1 wt % to about 50 wt % of the curable resin, and wherein the amine hardener is selected from the group consisting of diethyl toluene diamine; 2,4,6-tris(dimethylaminomethyl)phenol; bis(methylthio)-toluene diamine; and any combination thereof.

4. The method of claim 1, wherein the cement slurry comprises a cement and water, wherein the cement is selected from the group consisting of Portland cement, pozzolana cement, gypsum cement, high alumina content cement, slag cement, silica cement, pumice, perlite, and any combination thereof, and wherein the water is about 30% to about 60% by weight of cement.

5. The method of claim 1, wherein the cement slurry comprises a cement, water, and a thickener, wherein the thickener is about 0.01% to about 2.0% by weight of cement, and wherein the thickener comprises hydroxyl ethyl cellulose.

6. The method of claim 1, wherein the compatibilizer composition is about 0.01% to about 1% by weight of water.

7. The method of claim 1, wherein the substituted or unsubstituted $C_5$-$C_{50}$ hydrocarbon with at least one internal olefin is a $C_{15}$-$C_{18}$ alkene with at least one internal olefin, and is about 50 wt % to about 70 wt % of the compatibilizer composition.

8. The method of claim 1, wherein the polyether is about 25 wt % to about 35 wt % of the compatibilizer composition.

9. The method of claim 1, wherein the polyether has the structure:

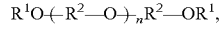

wherein:
at each occurrence $R^1$ is independently chosen from —H, —CH$_3$, and —CH$_2$CH$_3$,
at each occurrence $R^2$ is independently a substituted or unsubstituted (C$_1$-C$_5$) hydrocarbylene, and
n is an integer chosen such that the polyether has an M$_n$ of 100 to 10,000.

10. The method of claim 9, wherein $R^1$ is —H, and at each occurrence $R^2$ is independently chosen from —CH(CH$_3$)CH$_2$— and —CH$_2$CH$_2$—.

11. The method of claim 9, wherein the polyether has the structure

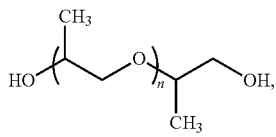

wherein n is about 40 to about 100.

12. The method of claim 1, wherein the compatibilizer composition further comprises a silica, wherein the silica is about 8 wt % to about 12 wt % of the compatibilizer composition, and wherein the silica comprises a silane-treated silica.

13. The method of claim 12, wherein the silane-treated silica comprises a poly(dimethylsiloxane)-treated silica.

14. The method of claim 1, wherein the compatibilizer composition further comprises a stabilizer, wherein the stabilizer is about 1.0 wt % to about 2.0 wt % of the compatibilizer composition, and wherein the stabilizer is selected from the group consisting of hydroquinone, catechol, hydroquinone monomethyl ether, an alkyl gallate, a hindered phenol, and any combination thereof.

15. The method of claim 14, wherein the stabilizer comprises a hindered phenol, and wherein the hindered phenol is selected from the group consisting of butylated hydroxyanisol; 4-ethoxyphenol; butylated hydroxytoluene, 4-methoxyphenol; 3-methoxyphenol; 2-tertbutyl-4methoxyphenol; 2-tert-butyl-4-methoxyphenol; 2,2-methylene-bis-(4-methyl-6-tert-butylphenol); and any combination thereof.

16. The method of claim 1, wherein the compatibilizer composition further comprises a fatty alcohol ethoxylate.

17. A system for performing the method of claim 1, the system comprising:
a tubular disposed in the subterranean formation; and
a pump configured to pump the composition into the subterranean formation through the tubular.

18. A method of treating a subterranean formation, comprising:
placing a composition comprising a compatibilized cement composition into a subterranean formation, the compatibilized cement composition comprising:
a curable resin or cured product thereof comprising diglycidyl ether bisphenol A resin, butyl glycidyl ether, cyclohexane methanol diglycidyl ether, diethyl toluene diamine, and 2,4,6-tris(dimethylaminomethyl)phenol, wherein the curable resin or cured product thereof is about 1% to about 50% by volume of the compatibilized cement composition;
a cement slurry comprising a class G cement, water, and hydroxyl ethyl cellulose, wherein the cement slurry is about 50% to about 99% by volume of the compatibilized cement composition; and
a compatibilizer composition, a reaction product thereof, or a combination thereof, the compatibilizer composition comprising:
a C$_{15}$-C$_{18}$ alkene with at least one internal olefin, and
a polyether having the structure:

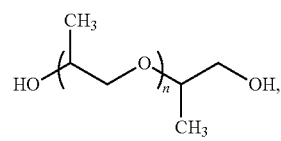

wherein n is about 40 to about 100,
wherein the compatibilizer composition is about 0.01% to about 5.0% by weight of water.

19. A compatibilized cement composition, comprising:
a curable resin or cured product thereof comprising a compound selected from the group consisting of diglycidyl ether bisphenol A resin, butyl glycidyl ether, cyclohexane methanol diglycidyl ether, diethyl toluene diamine, 2,4,6-tris(dimethylaminomethyl)phenol, and any combination thereof;
wherein the curable resin or cured product thereof is about 1% to about 50% by volume of the compatibilized cement;
a cement slurry comprising class G cement, water, and hydroxyl ethyl cellulose;
wherein the cement slurry is about 50% to about 99% by volume of the compatibilized cement; and
a compatibilizer composition, a reaction product thereof, or a combination thereof, the compatibilizer composition comprising:
a C$_{15}$-C$_{18}$ alkene with at least one internal olefin, and
a polyether having the structure:

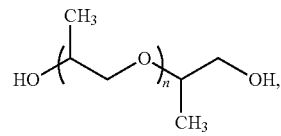

wherein n is about 40 to about 100, and
wherein the compatibilizer composition is about 0.01% to about 5.0% by weight of water.

* * * * *